(12) United States Patent
Kidd

(10) Patent No.: US 7,614,637 B1
(45) Date of Patent: Nov. 10, 2009

(54) REFUSE CONTAINER HITCHING DEVICE

(76) Inventor: Alan D. Kidd, 4 Deerwood, Shoal Creek, AL (US) 35242

( * ) Notice: Subject to any disclaimer, the term of this patent is extended or adjusted under 35 U.S.C. 154(b) by 48 days.

(21) Appl. No.: 12/044,154

(22) Filed: Mar. 7, 2008

(51) Int. Cl.
*B60D 1/18* (2006.01)
*B60F 1/00* (2006.01)

(52) U.S. Cl. .................... 280/480; 414/462; 224/519
(58) Field of Classification Search .................. 280/480, 280/480.1, 490.1, 493; 414/462; 224/519
See application file for complete search history.

(56) References Cited

U.S. PATENT DOCUMENTS

| | | | | |
|---|---|---|---|---|
| 4,280,713 A | * | 7/1981 | Bruhn | 280/416.1 |
| 5,806,738 A | * | 9/1998 | D'Angelo | 224/521 |
| 6,033,178 A | * | 3/2000 | Cummins | 414/462 |
| 6,698,995 B1 | * | 3/2004 | Bik et al. | 414/462 |
| 7,101,142 B2 | * | 9/2006 | Bik et al. | 414/462 |
| 2004/0164517 A1 | * | 8/2004 | Lewy et al. | 280/493 |
| 2004/0232184 A1 | * | 11/2004 | Moen et al. | 224/510 |
| 2005/0023796 A1 | * | 2/2005 | Rasmussen | 280/400 |
| 2005/0082329 A1 | * | 4/2005 | Cohen | 224/519 |
| 2006/0043133 A1 | * | 3/2006 | Bair | 224/519 |
| 2006/0118586 A1 | * | 6/2006 | Heravi | 224/519 |
| 2008/0061097 A1 | * | 3/2008 | Milender et al. | 224/519 |
| 2008/0122199 A1 | * | 5/2008 | Cearns | 280/490.1 |

* cited by examiner

*Primary Examiner*—Tony H. Winner

(57) ABSTRACT

A refuse container hitching device including a horizontally extending hitch insert, a vertically extending vertical member of adjustable length, a horizontally extending top member, a refuse container support plate that extending downwardly from the top member, and at least one locking strap for locking the handle of a refuse container to the support plate during towing.

5 Claims, 4 Drawing Sheets

REFUSE CONTAINER HITCHING DEVICE

FIELD OF THE INVENTION

The present invention generally relates to a vehicular hitching accessory and more particularly, relates to a refuse container hitching device for towing a refuse container behind a motor vehicle.

BACKGROUND OF THE INVENTION

Refuse containers are used in just about every household and commercial establishments. Refuse is regularly picked up by a refuse management company, for instance, on a weekly basis. For such pickup, the refuse containers from the household or the commercial establishment must be taken to the roadside for picking up by the refuse truck. In many instances, a house or a business building may be set back a long way from the road and thus the refuse containers must be wheeled a long way on the driveway to the roadside. It is a time consuming process which cannot be avoided. It is therefore desirable to provide a transportation device and method for hauling a refuse can to the roadside without manually doing so.

It is therefore an object of the present invention to provide a refuse container hitching device that allows a refuse can to be transported behind a motor vehicle.

SUMMARY OF THE INVENTION

In accordance with the present invention, a refuse container hitching device that can transport a refuse container behind a motor vehicle is provided.

In a preferred embodiment, the present invention refuse container hitching device is constructed of a horizontally extending hitch insert that has a horizontal aperture at a first end for engaging a vehicle hitch, a vertically extending member of adjustable length that has a lower end fixedly connected to a second end of the hitch insert, a horizontally extending top member that has one end fixedly connected to a top end of the vertical member and a free end extending away from the vertical member, a refuse container support plate extending downwardly at an angle between 10° and 45° from a vertical plane from the free end of the top member for engaging a refuse container, and at least one locking strap at the free end of the top member for removably locking the refuse container during transporting behind a vehicle.

BRIEF DESCRIPTION OF THE DRAWINGS

The invention will now be described, by way of example, with reference to the accompanying drawings, in which.

DETAILED DESCRIPTION OF THE PREFERRED EMBODIMENT

The present invention discloses a refuse container hitching device that can be used in transporting a refuse container for a short distance, such as on a driveway.

The present invention hitching device is a device for transporting a heavy wheeled trash container behind a vehicle from a home, or a business to the curbside. The hitch-engaged device greatly simplifies movement of a large plastic trash container, thereby saving time and effort for homeowners. It is particularly suitable for use by individuals living in rural areas that have long driveways since the garbage container would not have to be carried, lifted, or dragged for a long distance. The present invention specially designed hitching device has a square steel tubular base for insertion into the receiving hitch already installed at the rear of the motor vehicle, of either a car or a light truck. A set of apertures through the tube can be aligned with holes in the hitch to secure into position with a laterally inserted lock pin.

The outer end of the short horizontal tube has a support arm directed upward and rearward slightly. The top would have a short arm directed rearward. The outer end of the small elevated arm contains multiple plastic straps resembling tie wraps to attach onto the handle of the wheeled trash can. Once the present invention hitching device is secured to the vehicle and the trash can attached, an individual can slowly drive along the driveway while pulling the heavy container on the wheels to the curbside for drop off.

The present invention hitching device fulfills the need for towing a trash container down a long driveway. The appealing features of the present invention hitching device are its convenience, and the elimination of unnecessary work for dragging a trashcan. The device allows the easy transport of a refuse container behind a motor vehicle for the full length of a long driveway and thus save time and effort for the user.

Figure 1:
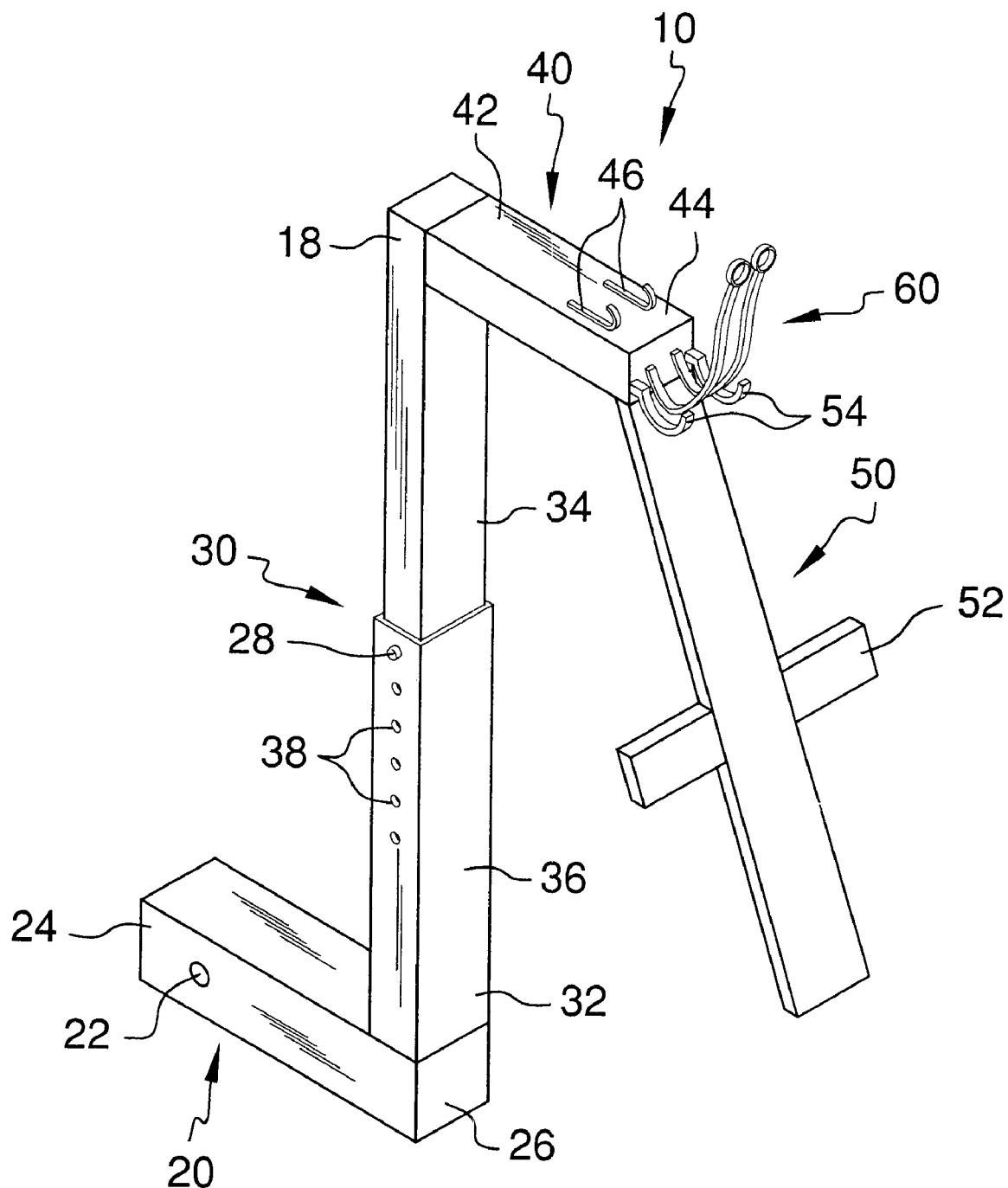
FIG. 1 is a perspective view of the present invention refuse container hitching device.
Figure 3:
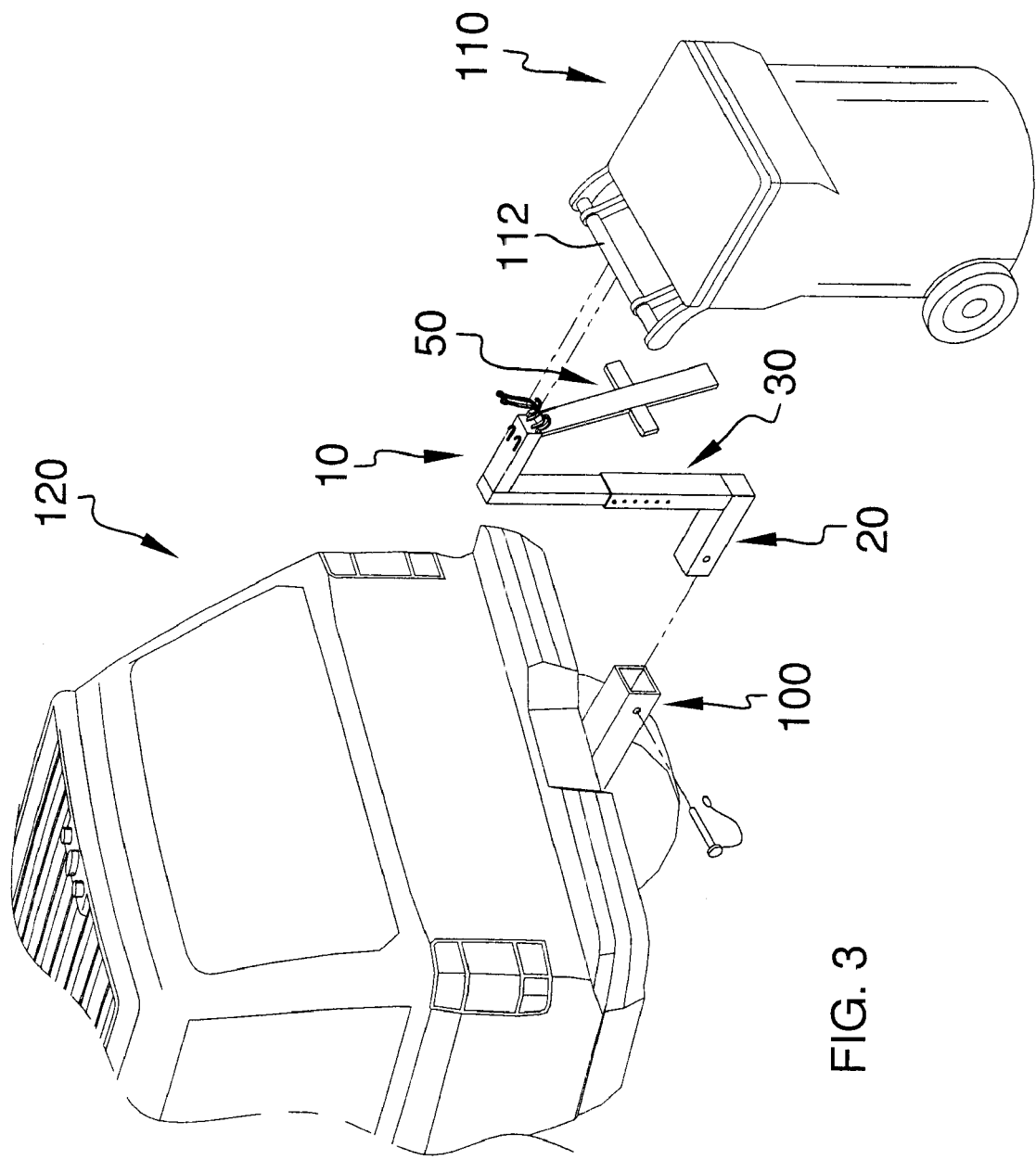
FIG. 3 is a perspective view of the present invention hitching device as positioned between a motor vehicle and a refuse container.

Referring initially to FIG. 1, wherein a present invention refuse container hitching device 10 is shown in perspective view. The hitching device 10 is constructed of a horizontally standing hitch insert 20 that has a horizontal aperture 22 at a first end 24 for engaging a vehicular hitch 100, shown in FIGS. 3 and 4. A vertically extending member 30 of adjustable length which has a lower end 32 fixedly connected to a second end 26 of the hitch insert 20. As shown in FIG. 1, the adjustable length vertical member 30 is formed by an inner member 34 and an outer member 36 slidingly engaging each other with a plurality of apertures 38 provided through both members 34,36 for adjusting its length and fixing the length by a locking pin 28. While square cross-section tubes 34,36 are shown in FIG. 1, any other suitable cross-section tubes may also be used.

A horizontally extending top member 40 which has one end 42 fixedly connected to a top end 18 of the vertical member 30 and a free end 44 extending away from the vertical member 30. A refuse container support plate 50, shown with a horizontal brace 52 for further stabilizing a refuse can 110 is further shown in FIG. 1. The support plate 50 preferably has a width of at least 6 inches to provide a stabilizing effect on the refuse container 110. The support plate 50 extends downwardly at an angle between about 10° and about 45° as measured from a vertical plane for engaging a refuse container 110 and to allow the container to lean on the support plate 50 during towing.

Figure 2:
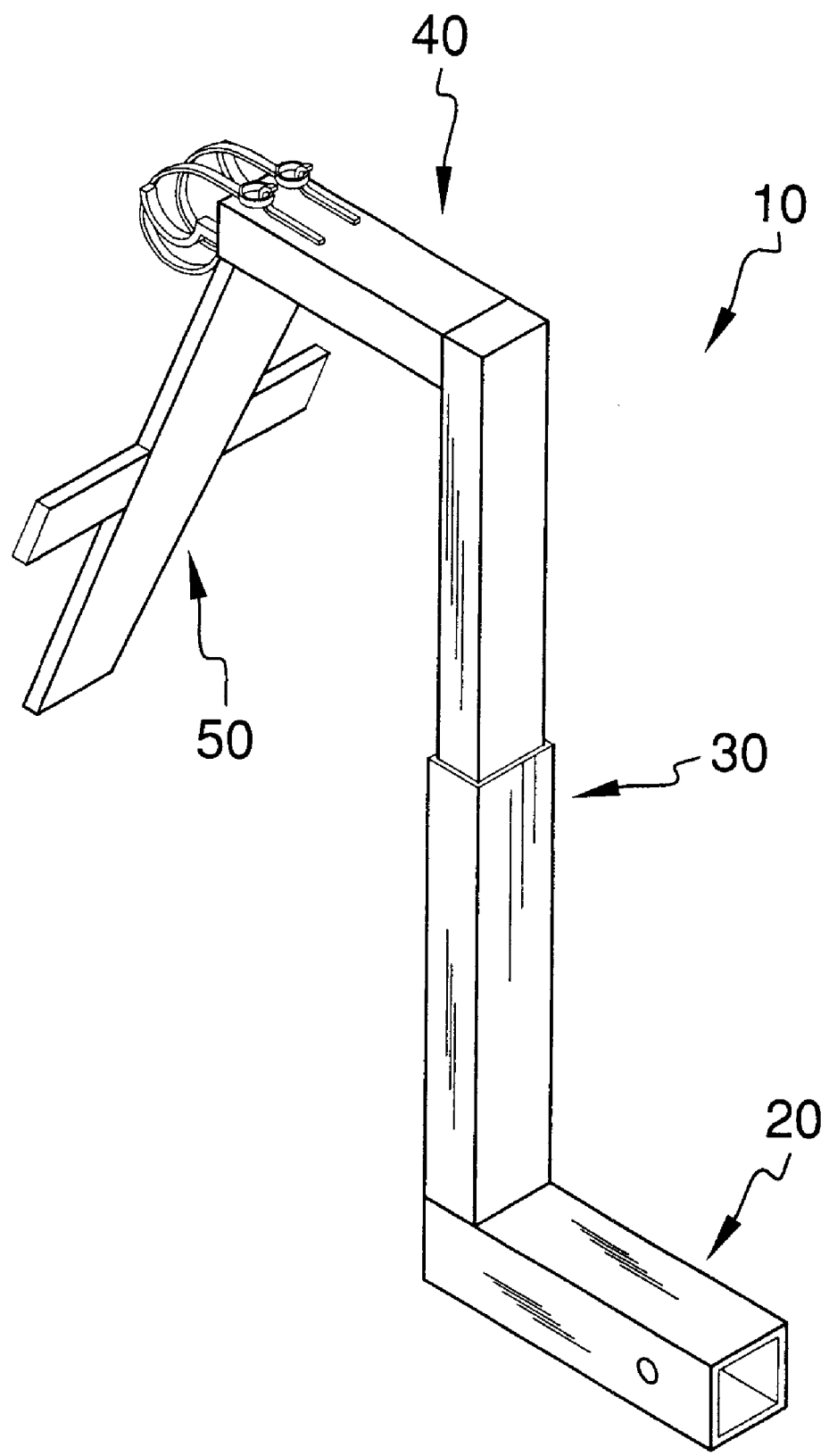
FIG. 2 is another perspective view of the present invention hitching device of FIG. 1 in a rear view.

To further stabilize the refuse can 110 during towing, at least one locking strap 60, while two straps are shown in FIG. 1, are provided for hooking over a handle portion 112 of the refuse container 110 onto hooks 46 provided on the top member 40. Positioning hooks 54 are also provided at the free end 44 of the top member 40 for the handle portion 112 of the refuse container 110 to rest during towing. A hooked position of the locking straps 60 onto the hooks 46 is shown in FIG. 2 in a rear view of the present invention hitching device 10.

Figure 4:
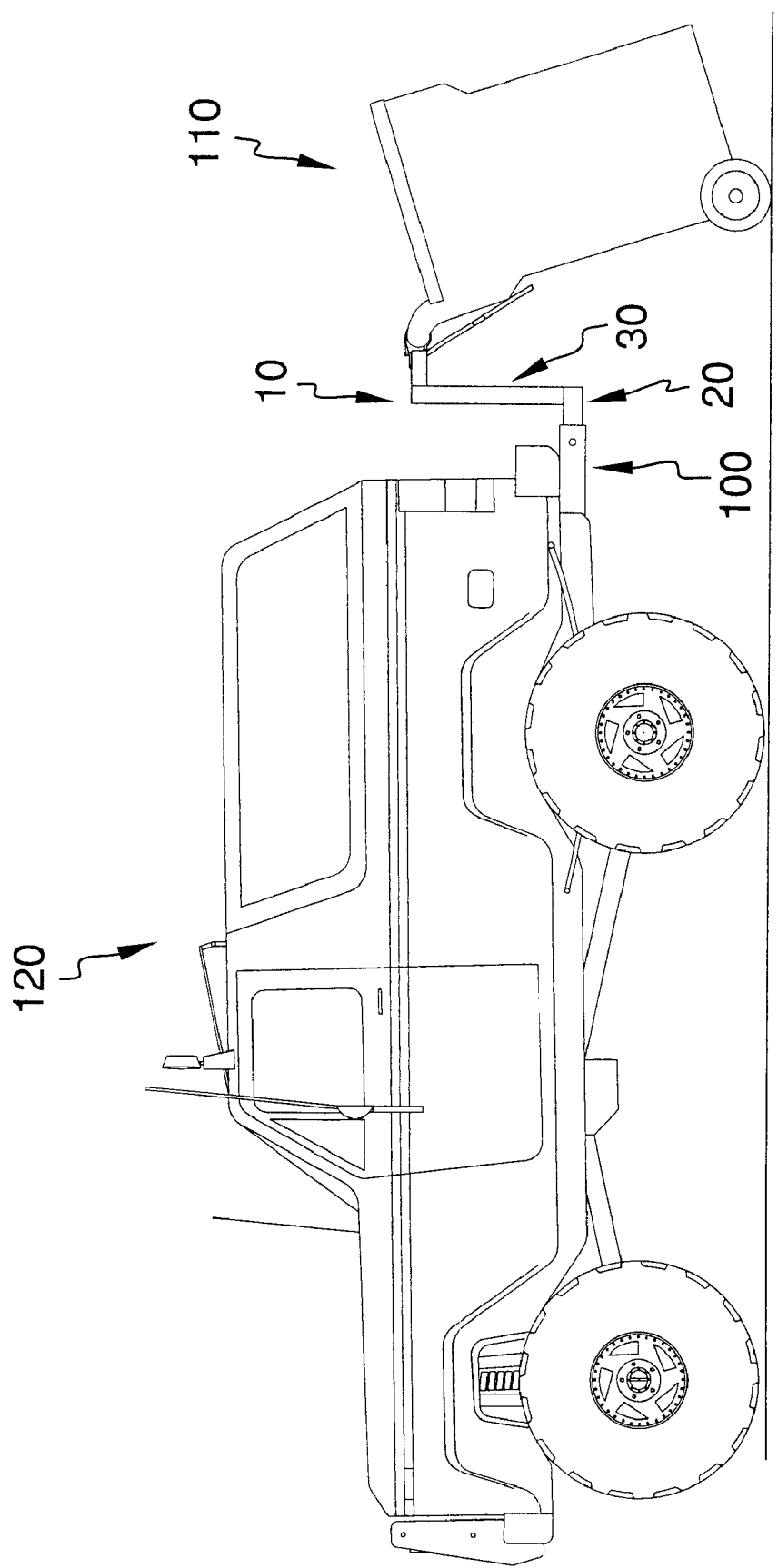
FIG. 4 is a side view of the present invention hitching device illustrating its usage.

FIG. 4 illustrates the use of the present invention hitching device 10 during a towing process behind a motor vehicle 120.

The present invention hitching device 10 can be suitable fabricated in a metallic material, such as aluminum, or in a rigid plastic material, such as one reinforced by glass fibers. The locking straps 60 can be suitably supplied in a durable plastic material, such as nylon or in a material such as leather.

The presenting invention refuse container hitching device has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A refuse container hitching device comprising:
    a horizontally extending hitch insert having a horizontal aperture at a first end for engaging a vehicle hitch;
    a vertically extending member of adjustable length having a lower end fixedly connected to a second end of said hitch insert;
    a horizontally extending top member having one end fixedly connected to a top end of said vertical member and a free end extending away from said vertical member;
    a refuse container support plate extending downwardly at an angle between 10° and 45° from a vertical plane from said free end of said top member for engaging a refuse container; and
    at least one locking strap at said free end of the top member for removably locking said refuse container during transporting behind a vehicle.

2. The refuse container hitching device according to claim 1, wherein said hitch insert, said vertical member, said top member and said refuse container support plate are formed in a metallic material.

3. The refuse container hitching device according to claim 1, wherein said vertical member, said top member and said refuse container support plate are fabricated in a glass fiber reinforced plastic material.

4. The refuse container hitching device according to claim 1, wherein said refuse container support plate further comprising a horizontal stabilizing brace for stabilizing said refuse container during towing.

5. The refuse container hitching device according to claim 1, wherein said vertically extending member of adjustable length further comprising an inner tube and an outer tube with a plurality of apertures and a locking pin for adjusting said length.

* * * * *